United States Patent [19]
Brix et al.

[11] Patent Number: 5,137,849
[45] Date of Patent: Aug. 11, 1992

[54] SEALING GLASS FOR THE PRODUCTION OF GLASS-TO-METAL SEALS

[75] Inventors: Peter Brix; Ludwig Gaschler, both of Mainz, Fed. Rep. of Germany

[73] Assignee: Schott Glaswerke, Mainz, Fed. Rep. of Germany

[21] Appl. No.: 600,509

[22] Filed: Oct. 22, 1990

[30] Foreign Application Priority Data

Oct. 23, 1989 [DE] Fed. Rep. of Germany ....... 3935227

[51] Int. Cl.$^5$ .............................................. C03C 8/24
[52] U.S. Cl. ........................................ 501/15; 501/77; 501/78
[58] Field of Search ............... 501/77, 78, 79, 14, 501/15; 429/181, 184

[56] References Cited

U.S. PATENT DOCUMENTS

| | | | |
|---|---|---|---|
| 2,352,425 | 6/1944 | Deyrup | 106/48 |
| 4,341,849 | 7/1982 | Park et al. | 429/104 |
| 4,406,994 | 9/1983 | Brech et al. | 501/14 |
| 4,446,241 | 5/1984 | Francel et al. | 501/14 |

FOREIGN PATENT DOCUMENTS

| | | |
|---|---|---|
| 262073 | 3/1988 | European Pat. Off. |
| 2942538 | 10/1979 | Fed. Rep. of Germany |
| 2439753 | 5/1980 | France |

OTHER PUBLICATIONS

Chemical Abstracts, 108:208855p, No. 24, Jun. 1988.
NTIS Tech Notes, P883-925307, Jul. 1983, Springfield, VS, U.S. Dept. of Energy, NTN 83-0458, "Glass for Sealing Lithium Cells".
Chemical Abstracts, vol. 90, 1979, Jun. 11, 1979, No. 191467Y.
CA 104:114783d (SU 1189824).

Primary Examiner—William R. Dixon, Jr.
Assistant Examiner—Chris Gallo
Attorney, Agent, or Firm—Millen, White & Zelano

[57] ABSTRACT

A sealing glass is provided for the production of glass-to-metal seals, especially for battery headers, in storage batteries having a lithium electrode. The constituents of the glass, expressed in % by weight on an oxide basis, comprise:

| | | | | | |
|---|---|---|---|---|---|
| 16-25 | $SiO_2$ | 0-8 | $Li_2O$ | 0-4 | MgO |
| 20-35 | $B_2O_3$ | 0-5 | $Na_2O$ | 5-12 | CaO |
| 15-24 | $Al_2O_3$ | 0-10 | $K_2O$ | 10-30 | BaO + SrO |
| | | 4-15 | Σ alkali oxide | 0-5 | ZnO |
| | | | | 15-40 | Σ alkaline-earth oxide + ZnO |

The coefficient of thermal expansion of the glass is closely matched to the metals in the cell housing. This glass also has a good welding strength and corrosion resistance, as well as satisfactory hydrolytic resistance.

8 Claims, No Drawings

SEALING GLASS FOR THE PRODUCTION OF GLASS-TO-METAL SEALS

BACKGROUND OF THE INVENTION

1. Field of the Invention

This invention relates in general to a sealing glass for the production of glass-metal seals and, more particularly, to glass seals which can be used for battery headers in batteries having a lithium electrode. The header consists of inner and outer conductors for internal attachment of the anode and cathode and external attachment of the battery leads. The conductors are electrically isolated from each other by a glass insulator (a glass seal), which also functions as part of the hermetic battery seal.

2. Description of the Related Art

In storage batteries with a lithium electrode, the cell housing is hermetically sealed. A seal is also provided between the housing and the terminals by a glass insulator in the cell head. The glass insulator is fused to the metal housing (outer electrode) and the outwardly extending inner metallic conductor, which, in general, is connected to the cathode or is an extension of the cathode itself.

The service life and shelf life of these cells depend in large part on the stability of the glass insulator, i.e., the stability of the sealing glass, since the sealing glass is exposed to especially strong corrosive attack by the contents of the cell. Further, the thermal expansion of the glass and the metal of the housing must closely match for long service life of the glass seal. Corrosion of the glass seal can be caused by lithium; by the depolarizer (the cathode material), such as $SO_2$, $SOCl_2$, $POCl_3$, $SeOCl_2$, $SO_3$, $VOCl_3$, $CrO_x$, $Cl_2$, $SO_2Cl_2$, $NO_2Cl$, $NOCl$, $NO_2$, $S_2Cl_2$, $S_2Br_2$, and their mixtures; by solid depolarizers, such as $HgO$, $HgCrO_4$, manganese dioxide; and, in general, by metal halides, oxides, chromates, bichromates, permanganates, periodates, molybdates, vanadates, chalcogenides, and their mixtures. The depolarizers most frequently used are $SOCl_2$, $SO_2$, and $CrO_x$. Corrosion of the glass seal can also be caused by the electrolytes in which the conducting salts are dissolved. Such electrolytes are, for example, tetrahydrofuran, propylene carbonate, dimethyl sulfate, dimethyl sulfoxide, gamma-butyrolactone, dimethyl carbonate, methyl formate, butyl formate, dimethoxyethane (DME), acetonitrile, n-nitrosodimethylamine and dimethylformamide. Light metal salts, especially lithium salts such as halides, perchlorates, tetrachloroaluminates, fluoroborates, hexafluorophosphates, hexafluoroarsenates, and clovoboranates, are used as conducting salts. The electrolyte conducting salt combinations most frequently used commercially at the present time are lithium tetrachloroaluminate in thionyl chloride or dimethoxyethane or propylene carbonate.

The glass seal also serves as electric insulation. Thus, the function is the glass seal is three-fold, providing (a) corrosion resistance, (b) electrical insulation, and (c) hermetic sealing of the cell.

The metals suitable for the cell housing or for the shunts are determined by the cell components with which they come into contact. Such metals compatible with lithium are, e.g., copper; iron, steel, and all iron alloys; nickel and nickel alloys such as KOVAR, INCONEL or MONEL, and especially iron-nickel alloys; titanium; tungsten; molybdenum; vanadium; niobium; tantalum; etc. Metals compatible with $SO_2$, $SOCl_2$, and $SO_2Cl_2$ are, e.g., titanium, tantalum, vanadium, tungsten, niobium, molybdenum, and nickel alloys such as KOVAR, INCONEL, MONEL, etc.; and metals resistant to silver chromate are, e.g., titanium, molybdenum, vanadium, tantalum, tungsten, chromium, and stainless steel.

The lithium cells now most widely used have housings and covers of nickel-plated steel or high-grade steel, as well as shunts of high-grade steel or sealing alloys on a Ni-Fe base. The "shunt" is the current conductor, normally the center pin. The "sealing alloys" are alloys which are "sealable" with the glass seal; thus, they have an appropriate coefficient of thermal expansion.

Since the service life of these cells essentially depends on the stability of the sealing glass of the glass insulator, there have been many attempts to improve the stability of the sealing glass.

To improve the service life of an insulator consisting of a conventional silicate or borosilicate sealing glass, DE-PS 29 04 396 discloses coating the glass surface exposed to the cell interior with a protective layer. This procedure is expensive, and there is always the danger that the covering will leak. Therefore, it has also been attempted to improve the solder glass itself, and numerous glasses have been tested to determine their suitability as a sealing glass in lithium cells. In the Sandia Report SAND 83-2314, pages 7-20, silicate, aluminoborate, phosphate, calcium aluminate, and alkali borate glasses are described. The silicate glasses have an $SiO_2$ content of over 40% by weight; they are susceptible to corrosion by the cell contents. In addition, the silicate glasses are impractical because of the mismatch of the coefficient of the thermal expansion relative to Ni/Fe alloys.

The aluminoborate glasses have only a slight stability against crystallization (devitrification stability) and insufficient corrosion resistance. They also lack a coefficient of thermal expansion which matches that of Ni/Fe alloys. The high cost of the aluminoborate glasses due to the relatively large amount of lanthanum therein makes this glass even more unsuited for use as a glass seal around terminals of storage batteries.

The phosphate glasses are largely inert relative to the cell contents; however, they are very sensitive to crystallization. Also, these glasses do not have a coefficient of thermal expansion which closely matches Ni/Fe alloys.

The calcium aluminate glasses, which essentially consist of CaO (up to 45% by weight), are actually very resistant to the battery contents; however, in practice, they are not useful because of their tendency to crystallize and also their lack of resistance to hydrolysis. These glasses were found to decompose in a stability test according to ISO 719.

The lithium borate glasses are actually largely inert relative to the cell contents; however, they are used only for experiments due to their tendency to crystallize making them unsuitable for use in lithium cells.

A sodium-resistant sealing glass is known from DE-OS 29 42 538, which is characterized by a high proportion of $B_2O_3$, and a low proportion of $SiO_2$. A Cs-vapor-resistant lithium-free glass with a high alkaline-earth content is described in CA 104,114783d/SU-PS 1189824; however, there is no mention of its suitability for use in lithium cells.

In J. Mater, Res., Vol 2, No. 2, p. 182 (1987), a number of different glasses are examined for their suitability as corrosion-resistant sealing glass for terminals in lithium batteries. After the examination of numerous glasses, the authors came to the conclusion that the corrosion of glass can be eliminated by the use of silicate-free glasses such as aluminoborate or borate glasses. However, such glasses, do not exist which are useful in practice.

Therefore, an object of the invention is to find a sealing glass for cells having corrosive contents, especially lithium cells. The sealing glass should have both a good resistance to the contents of the cell, and a coefficient of thermal expansion which is matched to a sufficient extent with that of the metals used for the cell housing and shunt, especially Ni/Fe alloys. Further, the sealing glass should have a sufficient hydrolytic resistance since in the course of their production the cells are washed and the glass-to-metal seal must survive the washing without loss of quality.

Upon further study of the specification and appended claims, further objects and advantages of this invention will become apparent to those skilled in the art.

SUMMARY OF THE INVENTION

A sealing glass is provided for the production of glass-metal seals in lithium batteries, especially for the terminals (battery headers) in these batteries. The constituents of the glass expressed in % by weight on an oxide basis, comprise:

| | |
|---|---|
| $SiO_2$ | 16–25 |
| $B_2O_3$ | 20–35 |
| $Al_2O_3$ | 15–24 |
| $Li_2O$ | 0–8 |
| $Na_2O$ | 0–5 |
| $K_2O$ | 0–10 |
| MgO | 0–2 |
| CaO | 5–12 |
| BaO + SrO | 10–30 |
| ZnO | 0–5 |
| Alkaline earth oxide + ZnO | 15–40 |
| Alkali oxide | 4–15. |

This sealing glass has a coefficient of thermal expansion alpha in the range 20°–300° C., of $8-9.5 \cdot 10^{-6} K^{-1}$ a transformation temperature Tg of 520° C. and lower, and a hydrolytic resistance of less than 1.500 micrograms of $Na_2O/g$. A lithium battery with this glass-metal seal has a particularly long service life.

It has been surprisingly discovered that despite the relatively high $SiO_2$ content, a metal-to-glass seal with the sealing glass of the present invention does not limit the service life of a lithium cell. According to the present invention, the $SiO_2$ content of the glass is not to exceed about 25% by weight, since higher amounts result in deterioration of the corrosion resistance of the glass. If the $SiO_2$ content of the glass falls below about 16%, both the hydrolytic resistance of the glass and the mechanical stability of resulting solder seal diminishes. The $SiO_2$ content of the glass of the present invention is preferably in the range of about 19–25% by weight of $SiO_2$.

The $B_2O_3$ content of the glass of the present invention can range between about 20 and 35% by weight. The boric acid increases the electrical volume resistance of the glass and decreases the coefficient of thermal expansion. If the boric acid content falls below 20% by weight, the electric specific resistance decreases; if the content increases over about 35% by weight, the hydrolytic stability and devitrification stability decrease. Especially favorable results are obtained with a $B_2O_3$ content between about 20 and 29% by weight.

$Al_2O_3$, as a glass component, increases the mechanical strength of the glass, much like $SiO_2$, but the $Al_2O_3$ decreases the coefficient of thermal expansion. $Al_2O_3$ can be present in the glass in amounts of about 15–24% by weight. If the upper limit of this range is exceeded, the viscosity of the glass is increased at certain sealing temperature. As a result, either undesirably high sealing temperatures or undesirably long melting times are required to obtain a durable seal. Further, the tendency toward devitrification also increases and the hydrolytic resistance decreases. If the $Al_2O_3$ content falls below about 14% by weight there is a danger of separation of the glass from the metal, as well as a mismatch of the coefficient of thermal expansion of the glass to that of the inside conductor. The $Al_2O_3$ content is preferably in the range of about 17–22% by weight.

The alkali metal oxides $Li_2O$, $Na_2O$ and $K_2O$ serve as fluxing agents to improve the meltability and at the same time to increase the coefficient of thermal expansion. With $Li_2O$, which can be present in the glass in amounts of about 0–8% by weight, preferably in amounts of about 1–7% by weight, the lowest viscosity is reached for a given coefficient of thermal expansion but the raw material is relatively expensive. With $K_2O$, which can be present in the glass in amounts of about 0–10% by weight, both the processing temperature and the softening temperature of the glass is lowered and the electrical volume resistance is increased.

$Na_2O$ which is the least expensive of the alkali oxides can be present in the glass of the present invention in amounts of not more than about 5% by weight, preferably of not more than about 4% by weight. $Na_2O$ has the effect of lowering the electrical resistance of the glass. In general, rubidium oxide and cesium oxide are not used as glass components because of their relatively high cost. They can, however, replace a part of the potassium, without resulting in a significant change of the glass properties.

The total of the alkali oxides can be between about 4 and 15% by weight. If the alkali oxides exceed about 15% by weight the hydrolytic resistance significantly decreases below acceptable levels. With an alkali oxide content below about 4% by weight, matching of the coefficient of thermal expansion of the glass to the metal is so unsatisfactory that with thermal cycling there is no assurance that a long-term tight seal between the glass and metal can be reliably maintained. A total alkali oxide content of about 6–14% by weight has proven especially suitable.

The alkaline earths, especially CaO, BaO and SrO also increase the thermal expansion, however not to the extent of the alkalies. The alkaline earths have a positive effect on the hydrolytic resistance, the strength and the electrical volume resistance in comparison with the alkalies; however, this is not so strongly pronounced compared with this melt-facilitating action. Magnesium oxide can be present in amounts of up to about 4% by weight, a higher content can adversely affect the devitrification stability of the glass. Preferably a MgO content of about 2% by weight is not to be exceeded.

The content of CaO can be between about 5 and 12% by weight. A CaO content below 5% by weight has a negative effect on the coefficient of thermal expansion and increases the tendency to separation, whereas amounts of over about 12% by weight can reduce the devitrification stability of the glass. Preferably a calcium oxide content between about 5 and 10% by weight can be used. Barium oxide and strontium oxide can together be present in the glass in an amount totaling between about 10 and 30% by weight. Amounts above 30% by weight result in an increased tendency to devitrification. The tendency to crystallization of strontium oxide is slightly greater than that of barium oxide but can be controlled within the desired limits by a matching of the alkali content. Preferably BaO and/or SrO are used in amounts totaling about 12-21% by weight.

Zinc oxide can be present in amounts of about 0-5% by weight in the sealing glass. In comparison with the other alkaline earths, ZnO has a positive effect on the hydrolytic resistance. But a content of about 5% by weight is not to be exceeded, since otherwise there is too great a tendency to crystallization and sealing mismatch of the glass-to-metal lead-in terminal.

A zinc oxide content of about 0-5% by weight is preferred. The total of the alkaline-earth oxides+zinc oxide can be between about 15 and 40% by weight. If the total of the divalent oxides is below about 15% by weight, a tight glass-to-metal seal cannot be achieved; if a content of about 40% by weight for the divalent oxides is exceeded, the resulting glasses show a strong tendency to devitrification. Contents of alkaline-earth oxides and zinc oxide of about 20-30% are preferred.

Fining agents such as $Sb_2O_3$, $As_2O_3$ or cerium(IV) compounds can be added to the glass in the usual concentrations of about 0-1% by weight without its properties being negatively affected. But these agents are not absolutely necessary for the production of the sealing glasses of the present invention.

The coefficient of thermal expansion of the glasses of the present invention have a good match to the metals to be sealed, and the resulting seal is corrosion-resistant and has a satisfactory hydrolytic resistance. These glasses make it possible to produce glass-to-metal seals with outstanding welding strength. This welding strength is important since usually the cell cover, already provided with a glass-to-metal seal, is welded to the cell housing. Also after this thermal stress of the glass-to-metal seal, the seal must perform its function.

The sealing glasses according to the present invention have a coefficient of thermal expansion alpha in the range 20°-300° C. of $8-9.5 \cdot 10^{-6} K^{-1}$, a transformation temperature Tg of 520° C. and lower, and a value for the hydrolytic resistance according to DIN 12111 of less than 1500 micrograms of $Na_2O$/g.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above and below, and of corresponding West German Application P 39 35 227.7, filed Oct. 23, 1989, are hereby incorporated by reference.

EXAMPLES

EXAMPLES 1-14

Fourteen different glass compositions were prepared according to the following procedure: The glasses were melted in a 1-liter platinum crucible with high-frequency heating at 1400° C. from batch components for 2.5 hours, then stirred with a platinum stirrer for 30 minutes at 1200° C., and after standing for another 45 minutes at 1350° C., the glasses were poured into a steel mold. The cast glasses were then cooled in a cooling furnace to room temperature starting from 520° C., at a cooling rate of 20° C./hour. The glass compositions prepared in this manner (synthesis values in % by weight on the basis of oxide) are summarized in table 1.

The hydrolytic resistance (H) according to DIN 12111 and the thermal expansion (alpha) in the range of 20°-300° C. was determined for each of the cooled castings. Further, in almost all the glasses, the glass transformation temperature (Tg), additionally in some cases the processing temperature ($V_A$), corresponds to a viscosity of $10^4$ dPa·s, and the density in grams per $cm^3$ were determined for each of the 14 glasses. The values for these properties are summarized in table 2.

In Examples 7 and 10, additionally the TK 100 value was determined, i.e., the temperature, at which the specific electrical conductivity was $100 \cdot 10^{-10}$ S·cm$^{-1}$. This value was 391 in Example 7 and 367 in Example 10.

The corrosion strength of the glasses relative to the battery contents was determined as follows: lithium/thionyl chloride cells 14.7 mm in diameter and a length of 25 mm were supported upright at the head while being maintained at 150° C. for 8 days so that the electrolyte was in contact with the sealing glass. After 8 days the cell was opened, and the glass seal which was exposed to the cell contents was examined for corrosion. The service life under the test conditions was determined from the stretch/draw ratio of corrosion front to glass diameter. The estimated service life in all cases was over 6 weeks, so that in practical operations a service life of at least 10 years is attainable.

TABLE 1

| Ex. No. | Glass Components in % By Weight on the Basis of Oxide | | | | | | | | | |
|---|---|---|---|---|---|---|---|---|---|---|
| | $SiO_2$ | $B_2O_3$ | $Al_2O_3$ | $Li_2O$ | $Na_2O$ | $K_2O$ | MgO | CaO | BaO | ZnO |
| 01 | 21.2 | 24.8 | 19.2 | 3.0 | 2.0 | 2.5 | — | 7.3 | 20.0 | — |
| 02 | 19.7 | 28.3 | 19.2 | 2.0 | 2.0 | 6.5 | — | 7.3 | 15.0 | — |
| 03 | 21.7 | 27.3 | 19.2 | 2.0 | 3.0 | 6.5 | — | 7.3 | 13.0 | — |
| 04 | 20.7 | 27.3 | 19.2 | 2.0 | 3.0 | 7.5 | — | 7.3 | 13.0 | — |
| 05 | 19.7 | 27.3 | 19.2 | 2.0 | 2.0 | 7.5 | — | 7.3 | 15.0 | — |
| 06 | 20.7 | 27.3 | 17.2 | 2.0 | 2.0 | 8.5 | — | 7.3 | 15.0 | — |
| 07 | 19.7 | 26.3 | 18.2 | 2.0 | 2.0 | 8.5 | — | 7.3 | 16.0 | — |
| 08 | 21.85 | 22.5 | 20.5 | 2.0 | 2.3 | 8.25 | — | 7.3 | 15.3 | — |
| 09 | 24.5 | 22.0 | 18.6 | 2.0 | 4.0 | 5.0 | — | 7.3 | 16.6 | — |
| 10 | 23.2 | 20.0 | 21.2 | 2.0 | 2.3 | 9.3 | — | 5.0 | 17.0 | — |
| 11 | 25.0 | 20.6 | 18.35 | 2.5 | 2.4 | 7.4 | 1.0 | 5.25 | 17.5 | — |
| 12 | 22.9 | 20.0 | 21.1 | 7.0 | — | — | — | 9.6 | 19.4 | — |

TABLE 1-continued

| Ex. No. | SiO$_2$ | B$_2$O$_3$ | Al$_2$O$_3$ | Li$_2$O | Na$_2$O | K$_2$O | MgO | CaO | BaO | ZnO |
|---|---|---|---|---|---|---|---|---|---|---|
| | Glass Components in % By Weight on the Basis of Oxide | | | | | | | | | |
| 13 | 22.0 | 23.7 | 18.95 | 6.8 | — | — | 1.1 | 9.5 | 17.95 | — |
| 14 | 21.4 | 23.3 | 19.75 | 2.5 | 2.0 | 4.3 | — | 5.65 | 16.1 | 5.0 |

TABLE 2

Glass Properties

| Example No. | alpha ($10^{-6} \cdot K^{-1}$) (20–300° C.) | Tg (°C.) | V$_A$ (°C.) | Density (g·cm$^{-3}$) | H ($\mu$g Na$_2$O·g$^{-1}$) |
|---|---|---|---|---|---|
| 01 | 8.10 | | | | 552 |
| 02 | 8.23 | 493 | | | 1042 |
| 03 | 8.50 | | | | 738 |
| 04 | 8.76 | 485 | | | 936 |
| 05 | 8.57 | 481 | | | 1066 |
| 06 | 8.94 | 487 | | | 1388 |
| 07 | 8.97 | 487 | 749 | 2.747 | 1460 |
| 08 | 8.82 | 483 | 770 | 2.736 | 453 |
| 09 | 8.74 | 492 | | 2.781 | 381 |
| 10 | 9.36 | 486 | 752 | 2.793 | 676 |
| 11 | 9.01 | 480 | 775 | 2.781 | 341 |
| 12 | 8.72 | 466 | | | 412 |
| 13 | 8.55 | 474 | | | 512 |
| 14 | 8.00 | 484 | | | 121 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

In the claims, the expression "terminals" is meant to include the above-described battery headers.

What is claimed is:

1. A sealing glass suitable for the production of glass-metal seals which can be used to seal terminals in storage batteries having a lithium electrode, the constituents of said glass, expressed in % by weight on an oxide basis, comprising:

| SiO$_2$ | 19–25 | Li$_2$O | 1–7 | MgO | 0–2 |
|---|---|---|---|---|---|
| B$_2$O$_3$ | 20–29 | Na$_2$O | 0–4 | CaO | 5–10 |
| Al$_2$O$_3$ | 17–22 | K$_2$O | 0–10 | BaO + SrO | 15–21 |
| Σ alkali oxides | | 6–14 | | ZnO | 0–5 |
| Σ alkaline-earth oxide + ZnO | | | | | 20–30, | wherein the glass has a coefficient of thermal expansion in the range 20–300 of 8–9.5 ·$10^{-6}$·$K^{-1}$, a transformation temperature of 520° C. and lower, and a hydrolytic resistance of less than 1500 micrograms of Na$_2$O/g.

2. A sealing glass according to claim 1, wherein up to about 5% by weight (absolute) of the Al$_2$O$_3$ is replaced by La$_2$O$_3$.

3. A sealing glass according to claim 1, wherein the K$_2$O is replaced in part by rubidium oxide and cesium oxide.

4. A sealing glass according to claim 1, wherein the glass contains a fining agent selected from the group consisting of Sb$_2$O$_3$, As$_2$O$_3$ and cerium IV compounds.

5. A storage battery having a lithium electrode and a metal housing with terminals extending through the housing, said battery having a glass-metal seal between the housing and the terminal, a sealing glass according to claim 3 being used to form the glass-metal seal.

6. A storage battery having a lithium electrode and a metal housing with terminals extending through the housing, said battery having a glass-metal seal between the housing and the terminals, a sealing glass according to claim 1 being used to form the glass-metal seal.

7. A lithium/thionyl chloride battery having a lithium electrode and a metal housing and at least one terminal extending through the housing, said battery having a glass-metal seal between the terminal and the metal housing, a sealing glass according to claim 3 being used to form the glass-metal seal.

8. A process of sealing a lithium storage battery having an outer metallic housing and an inner metal electrode with sealing glass, comprising fusing the sealing glass of claim 1 to said outer metallic housing and to said inner metallic electrode.

* * * * *